Feb. 15, 1966   J. R. HENTZI   3,234,987
SELF-PIERCING NUT WITH ATTACHING FLANGE
Filed May 18, 1962
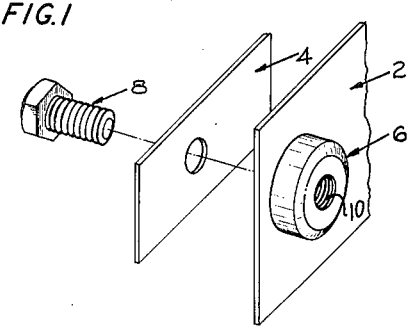
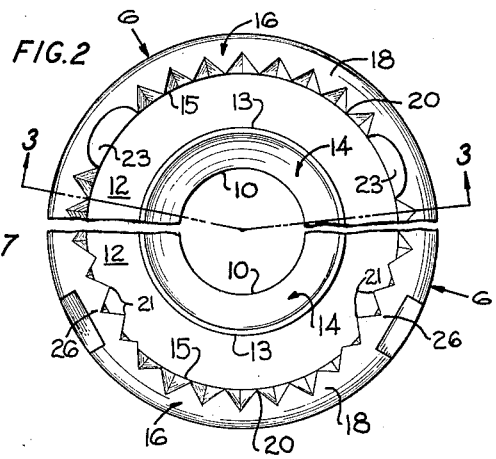
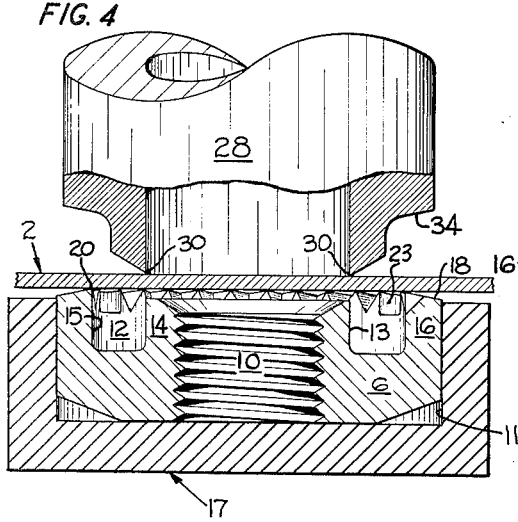
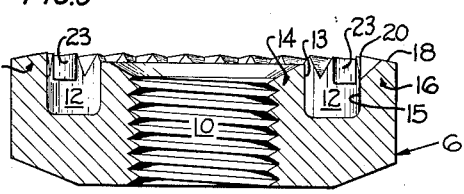
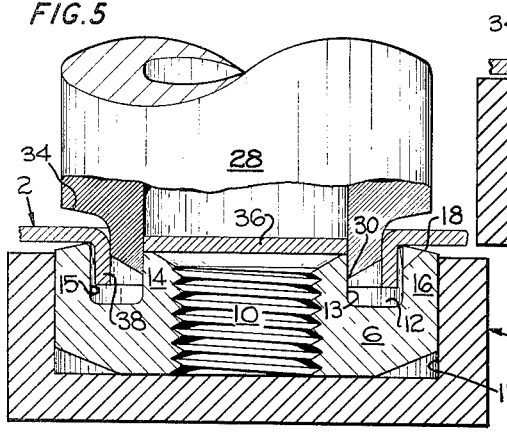
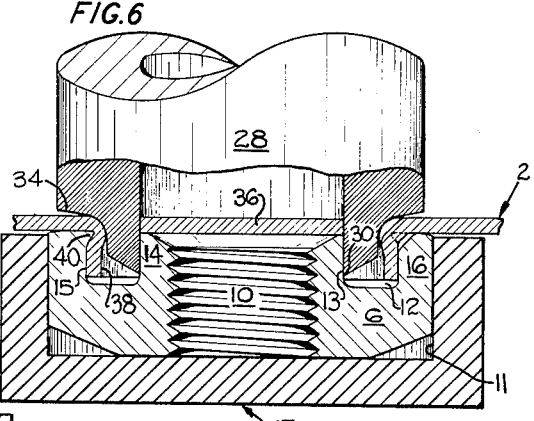
INVENTOR.
JOFFRE R. HENTZI
BY Lindsey, Prutzman and Hays
ATTORNEYS

United States Patent Office 3,234,987
Patented Feb. 15, 1966

3,234,987
SELF-PIERCING NUT WITH ATTACHING FLANGE
Joffre R. Hentzi, Kensington, Conn., assignor to The Stanley Works, New Britain, Conn., a corporation of Connecticut
Filed May 18, 1962, Ser. No. 195,892
4 Claims. (Cl. 151—41.72)

This invention generally relates to devices of the type that are permanently secured to a body of sheet material and has particular significance to an improved nut, and the method of and apparatus for securing the nut to a body of sheet metal.

One of the objects of the present invention is the provision of an improved self-piercing nut or the like that may be quickly and easily secured to a body of sheet material by the application of a force almost entirely dependent upon the gauge and composition of the sheet material.

A further object of the present invention is the provision of an improved self-piercing nut or the like that is adapted to be secured to a body of sheet metal so as to offer increased resistance to rectilinear and rotational movement with respect to the sheet metal.

A still further object of the present invention is the provision of an improved method of and apparatus for rigidly securing a nut or the like to a body of sheet material in a single-stroke punch operation and with extreme efficiency and economy.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is an exploded perspective view showing the improved nut of the present invention as used with an associated bolt in mounting two sections of sheet material together;

FIG. 2 is a fragmentary plan view of a nut embodying one form of the present invention;

FIG. 3 is a cross-sectional elevational view taken along lines 3—3 of FIG. 2;

FIG. 4 is a cross-sectional view showing the nut as in FIG. 3 and additionally showing fragments of a sheet member and punching apparatus at an initial stage of assembly of the nut to the sheet member;

FIG. 5 is a view similar to FIG. 4 but showing an intermediate stage of the assembly operation;

FIG. 6 is a view similar to FIG. 5 but showing the final stage of the assembly operation; and FIG. 7 is a view similar to FIG. 2 but showing a nut embodying an alternate form of the present invention.

Referring to the drawings in which like numerals refer to like parts, there is shown an embodiment of this invention in which a sheet or plate member 2 is formed from deformable material, such as sheet metal or the like; and a member 4 adapted to be mounted to the sheet member 2 through means of a nut generally designated 6 and an associated bolt 8.

In the illustrated embodiment, the nut 6 is shown as being comprised of a generally circular body formed from a high ductile steel; however, other shapes and other ductile materials may be employed as desired. The nut is provided with a central threaded bore 10 adapted to receive the bolt 8 for effecting the usual threaded connection.

In accordance with the invention, the nut 6 is provided with a skirt or hub 14 around the bore 10 and a peripheral rim or flange 16 surrounding the hub 14 and spaced therefrom to define an intermediate generally U-shaped recess 12 therebetween. The outer wall 13 of the hub 14 is disposed in a direction parallel to the axis of the nut 6 and is shown as being of generally circular shape. The inner wall 15 of the rim 16 is also shown as being disposed in a direction parallel to the axis of the nut 6 and of generally circular shape, although for reasons more fully set forth below, the wall 15 may be of noncircular configuration.

As viewed in FIG. 3, the upper face 18 of the rim 16, which face is adapted to contact the sheet member 2 when the nut is assembled as will be subsequently described, is tapered upwardly toward the inner edge 20 of the rim 16 for a purpose to be hereinafter described. I have found that satisfactory results are obtained when the taper of upper face 18 is from about 7° to 10°. Additionally, the intersection of wall 15 and face 18 may be notched or serrated as indicated at 20 to provide a means for increasing torsional resistance of the nut 6 relative to the sheet member 2 when the latter are assembled together.

The nut 6 is assembled to the sheet member 2 by first placing the nut in the mounting cavity 11 of a back-up member 17 and then placing the sheet member on the recessed face of the nut 6 as shown in FIG. 4. A hollow punch 28 having an annular cutting edge 30 is positioned in axial alignment with the wall 13 of the hub 14. It should be noted that wall 13 is dimensioned to provide a very small clearance with the hollow bore of punch 28. As the punch 28 is moved downwardly over hub 14, it pierces the sheet member 2 and cuts a slug 36 therefrom. Continued downward movement of punch 28 into recess 12 causes the punch to draw or deform an annular flange 38 into the recess 12 as shown in FIG. 5. Upon continued movement of the punch 28 into the recess 12, the face 34 of the punch 28, acting through the sheet member 2, will apply a compressive force concentrated on the intersection of upper face 18 of the rim 16 and inner wall 15 to deform the material thereof inwardly so as to form an inwardly directed peripheral bead or lip 40 along the inner edge of the rim 16 as shown in FIG. 6. I prefer to provide a taper on face 34 of about 7° to 10° since this aids in concentrating the force on the lip 40 and thereby minimizes the force required to assemble the nut on the sheet material.

Since lip 40 is formed as the downward movement of punch 28 continues, it is accompanied by the further drawing of the sheet member 2 to lengthen flange 38. As a result of this, the outer wall of flange 38 is shaped to include a groove which is complementary to lip 40.

When the punch reaches the position shown in FIG. 6, the assembly is completed and the pierced slug 36 is retained within the punch for removal therewith.

As indicated above, in the final assembled relationship of the nut 6 and sheet member 2, as shown in FIG. 6, a permanent and secure connection is provided through means of the deformation of flange 38 around the lip 40 and the biting action of teeth 20 produces a noncircular juncture therebetween to increase the resistance to rotational movement therebetween.

If it is desired to further increase the resistance of the assembly to relative rotation, auxiliary means may be utilized to provide noncircular juncture between lip 40 and flange 38. For example, and as shown in FIG. 2, such means may comprise one or more depressions 23 formed on the wall 16. It will be apparent that during the drawing of flange 38 in the assembly of nut 6 on sheet member 2, the portion of the sheet member 2 overlying the depressions 23 will be unsupported and hence will be somewhat deformed into depressions 23.

Alternatively, the noncircular nature of lip 40 can be enhanced by deforming the upper end of wall 16 inwardly before or after assembly of nut 6 on sheet member 2 as indicated at 26 of FIG. 7 to cause the teeth 21 to be moved inwardly to increase the biting grip of these teeth on flange 38.

From the foregoing description, it will be seen that the present invention provides a nut that may be effectively secured by a simple one-stroke punching operation to sheet material, wherein it will be permanently and rigidly held to preclude displacement from the sheet material. Additionally, it will be seen that the punching operation of the present invention is extremely susceptible to mass assembly and does not require a relatively great punching force, elaborate or expensive tools and a pre-pierced hole in the sheet material.

As will be apparent to persons skilled in the art, various modifications and adaptations of the structure above described will become readily apparent without departure from the spirit and scope of the invention, the scope of which is defined in the appended claims.

I claim:

1. A nut adapted to be secured to sheet material comprising a body formed of a hard deformable substance and having a hollow center post providing a threaded bore for receiving a bolt, said center post having an outer side surface and an end surface thereof intersecting at substantially right angles to define a piercing edge, and outer flange spaced from and surrounding the center post defining a recess therebetween, said center post and said flange being generally concentric and extending in the same direction from said body, said flange terminating at its free end in a face tapered upwardly across the entire thickness thereof so that the inner edge of said flange projects further in the direction of said end of the body than does the outer edge of said flange and having a plurality of spaced projections at the inner edge of said free end extending toward the recess.

2. A nut adapted to be secured to sheet material comprising a body formed of a hard deformable substance and having a hollow center post providing a threaded bore for receiving a bolt, said center post having an outer side surface and an end surface thereof intersecting at an angle to define a piercing edge, an outer flange spaced from and surrounding the center post defining a recess therebetween, said center post and said flange being generally concentric and extending in the same direction from said body, said flange terminating at its free end in a face generally tapered upwardly from the outer side surface to the inner side surface thereof so that the inner edge of said flange projects further in the direction of said end of the body than does the outer edge of said flange to support the inner edge of the flange against deformation in the direction away from said recess upon the application of compressive force on said face of said flange, and a plurality of spaced projections on the inner edge of said free end extending toward the recess.

3. An assembly comprising a body of sheet material and a nut secured thereto; said nut comprising a body formed of had deformable substance and having a hollow center post providing a threaded bore for receiving a bolt and an outer rim spaced from and surrounding the center post and defining a recess therebetween, said center post and said rim being generally concentric and extending in the same direction from said body; said sheet material overlying the rim of said nut and having an apertured flange positioned in the recess of said nut, said rim terminating at its free end in a face engaging said sheet material and having an interrupted bead comprising a plurality of spaced projections at the inner edge of said free end of said rim extending toward said center post compressively encircling and engaging the flange of sheet material, the inner ends of said projections being disposed closer to the center post than is the surface of the end portion of the flange of sheet material positioned in said recess which lies adjacent said rim, whereby the inner ends of said projections overlie portions of said flange to secure the nut and sheet material against relative axial and rotational movement.

4. An assembly as recited in claim 3 wherein the center post extends no further than the surface of the sheet material opposite that which the nut engages.

References Cited by the Examiner

UNITED STATES PATENTS

| 521,825 | 6/1894 | Shipe | 29—432 |
| 1,502,399 | 7/1924 | Renner | 151—41.72 |
| 2,018,683 | 10/1935 | Meyer et al. | 29—432 |
| 2,444,145 | 6/1948 | Rosan | 151—41.73 |
| 2,673,390 | 3/1954 | Broberg | 29—432 |
| 2,772,472 | 12/1956 | Ballou | 29—520 |
| 2,782,827 | 2/1957 | Rosan | 151—41.73 |
| 2,859,445 | 11/1958 | Larrabee | 1—260 |
| 2,944,262 | 7/1960 | Richman et al. | 1—260 |
| 3,000,420 | 9/1961 | Spokes | 151—41.73 |
| 3,137,336 | 6/1964 | Wing | 151—41.73 |

FOREIGN PATENTS

| 370,948 | 4/1932 | Great Britain. |

CARL W. TOMLIN, Primary Examiner.

EDWARD C. ALLEN, M. HENSON WOOD, JR.
*Examiners.*